(12) United States Patent
Okada et al.

(10) Patent No.: US 8,174,745 B2
(45) Date of Patent: May 8, 2012

(54) OPTICAL UNIT, METHOD FOR CONTROLLING DRIVE, AND HOLOGRAPHIC APPARATUS

(75) Inventors: Hitoshi Okada, Chiba (JP); Satoru Seko, Kanagawa (JP)

(73) Assignee: Sony Corporation, Tokyo (JP)

(*) Notice: Subject to any disclaimer, the term of this patent is extended or adjusted under 35 U.S.C. 154(b) by 704 days.

(21) Appl. No.: 12/265,337

(22) Filed: Nov. 5, 2008

(65) Prior Publication Data

US 2009/0116088 A1 May 7, 2009

(30) Foreign Application Priority Data

Nov. 7, 2007 (JP) .................................. 2007-289692

(51) Int. Cl.
*G03H 1/04* (2006.01)
(52) U.S. Cl. .......................................... 359/35; 359/305
(58) Field of Classification Search ........................ None
See application file for complete search history.

(56) References Cited

U.S. PATENT DOCUMENTS 3,962,688 A * 6/1976 Westerberg ................ 369/30.15
2002/0163680 A1* 11/2002 Zabka ............................. 359/10

FOREIGN PATENT DOCUMENTS

| JP | 63-273228 | | 11/1988 |
| JP | 02-267732 | A | 11/1990 |
| JP | 06-333233 | A | 12/1994 |
| JP | 2002-341732 | | 11/2002 |
| JP | 2005-234145 | | 9/2005 |
| JP | 2006-251643 | | 9/2006 |

* cited by examiner

*Primary Examiner* — Derek S Chapel
(74) *Attorney, Agent, or Firm* — SNR Denton US LLP (57) ABSTRACT

An optical unit includes an acousto-optic deflector and a drive control unit. The drive control unit controls the acousto-optic deflector by changing a frequency of a voltage applied to an acousto-optic medium of the acousto-optic deflector to a frequency in a first frequency range during a first period representing a deflection control period and changing the frequency of the voltage to a frequency in a second frequency range different from the first frequency range during a second period representing a transmittance control period.

9 Claims, 7 Drawing Sheets

OPTICAL UNIT, METHOD FOR CONTROLLING DRIVE, AND HOLOGRAPHIC APPARATUS

CROSS REFERENCES TO RELATED APPLICATIONS

The present invention contains subject matter related to Japanese Patent Application JP 2007-289692 filed in the Japanese Patent Office on Nov. 7, 2007, the entire contents of which are incorporated herein by reference.

BACKGROUND OF THE INVENTION

1. Field of the Invention

The present invention relates to an optical unit using an acousto-optic deflector (AOD), a method for controlling the AOD, and a holographic apparatus that record and reconstruct data on a holographic recording medium using interference fringes generated by a signal light beam and a reference light beam.

2. Description of the Related Art

Recently, a holographic recording and reconstructing method for recording data using interference fringes generated by a signal light beam and a reference light beam has been developed.

Figure 8:
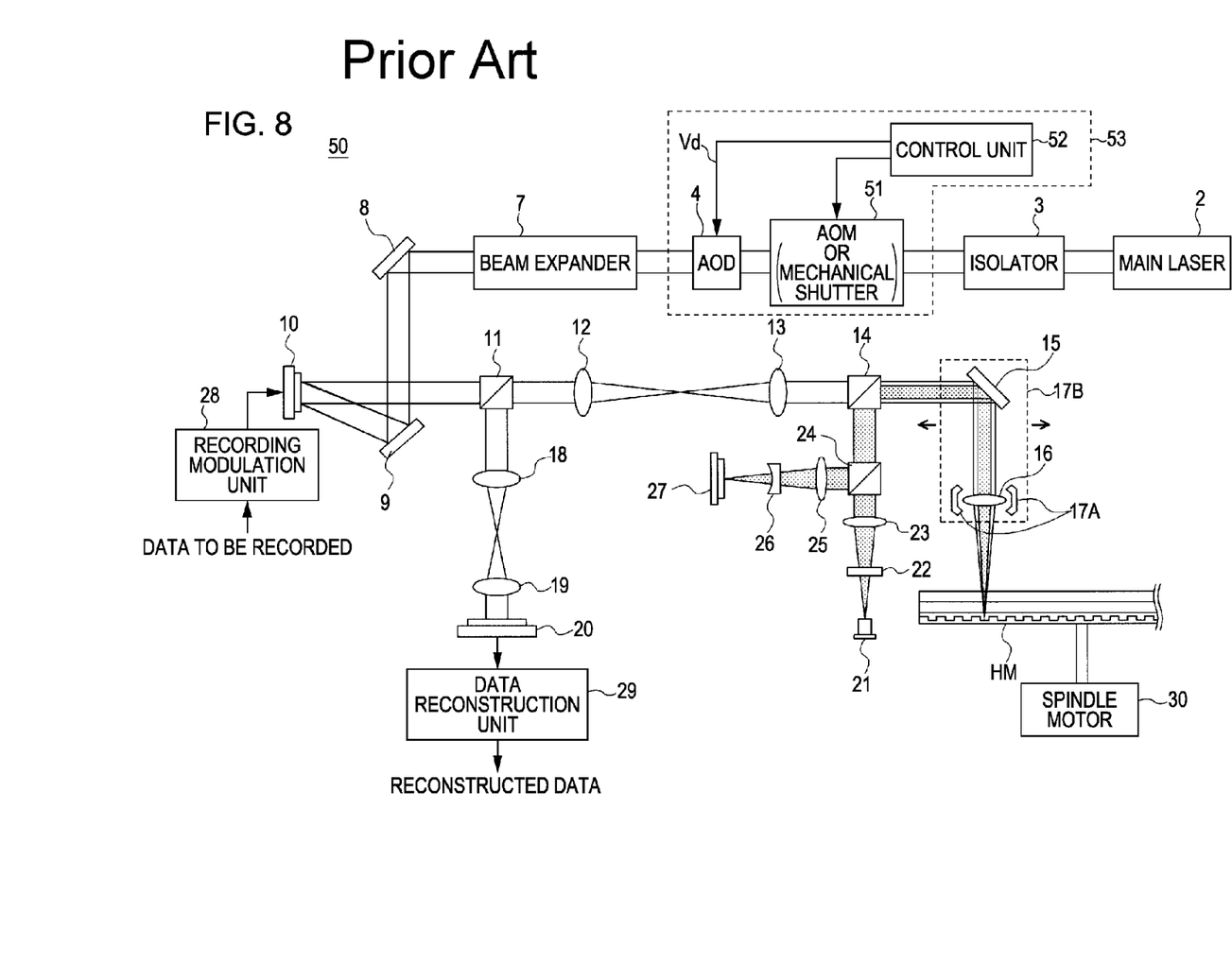
FIG. 8 illustrates an exemplary internal configuration of an existing holographic apparatus.

FIG. 8 illustrates a typical internal configuration of an existing holographic recording and reconstructing apparatus 50. In particular, FIG. 8 illustrates the structure of an optical system of the holographic recording and reconstructing apparatus 50.

As shown in FIG. 8, a holographic recording medium HM has, for example, a disc shape. The holographic recording medium HM is placed at a predetermined location inside the holographic recording and reconstructing apparatus 50 and is rotatingly driven by a spindle motor 30. The holographic recording and reconstructing apparatus 50 records and reconstructs data on the rotating holographic recording medium HM.

In existing recordable discs, such as compact discs-recordable (CD-Rs) and digital versatile discs-recordable (DVD-Rs), a groove is formed so that a data recording and reconstructing apparatus can control the position of a laser spot on the disc even when no data are recorded. Similarly, holographic recording media HM have a layer including a groove in order to control the position of a laser spot.

A method for recording and reconstructing data on a holographic recording medium HM is schematically described next.

In order to record data, a signal light beam subjected to spatial light modulation in accordance with data to be recorded and a reference light beam different from the signal light beam are emitted onto a holographic recording medium. Thereafter, interference fringes (a diffraction grating) generated by the two beams are recorded in the holographic recording medium HM. Thus, the data is recorded.

In contrast, in order to reconstruct the data, a reference light beam is emitted onto the holographic recording medium HM. By emitting the reference light beam in this manner, a diffraction light beam in accordance with the interference fringes formed in the holographic recording medium HM can be obtained. That is, by emitting the reference light beam, a reconstructed image (a reconstruction signal light beam) in accordance with the recorded data can be obtained.

Subsequently, by detecting the reconstructed image using an image sensor, such as a charge coupled device (CCD) sensor or a complementary metal-oxide semiconductor (CMOS) sensor, the recorded data can be reconstructed.

The holographic recording and reconstructing apparatus 50 shown in FIG. 8 has a configuration that realizes the above-described recording and reconstructing method.

The holographic recording and reconstructing apparatus 50 includes a main laser 2. The main laser 2 serves as a light source of a laser beam used for recording and reconstructing data on a holographic recording medium HM. For example, the main laser 2 is designed so as to output a laser beam having a wavelength of about 405 nm (i.e., a blue-violet laser beam).

The recording and reconstructing laser beam emitted from the main laser 2 passes through an isolator 3. The recording and reconstructing laser beam then passes through an acousto-optic modulator (AOM) 51 and an AOD 4 disposed in an image stabilization function unit 53 (the image stabilization function unit 53 is described in more detail below). Thereafter, the diameter of the laser beam is controlled to a desired value by a beam expander 7. The laser beam is then reflected off a mirror 8 and a mirror 9. The laser beam is then made incident on a spatial light modulator (SLM) 10.

The SLM 10 performs spatial light modulation on the incident recording and reconstructing laser beam so as to generate the above-described reference light beam and a signal light beam. For example, a diffraction spatial light modulator including a plurality of micromirrors arranged therein or a spatial light modulator using a liquid crystal panel can be used for the SLM 10. These spatial light modulators can perform spatial light modulation on a pixel-by-pixel basis. In this way, the above-described signal light beam based on data to be recorded and reference light beam having a predetermined intensity pattern can be generated.

Each of the pixels of the SLM 10 is controlled by a recording modulation unit 28.

As described above, when data is recorded, a signal light beam having a pattern in accordance with the data to be recorded and a reference light beam are generated. When data is recorded, these signal light beam and reference light beam generated by the SLM 10 are emitted onto the holographic recording medium HM via a beam splitter 11, a relay lens 12, a relay lens 13, a dichroic mirror 14, a mirror 15, and an objective lens 16. In this way, the signal light beam and the reference light beam interfere with each other, so that a diffraction grating (a hologram) in accordance with the above-described signal light beam pattern is generated in the holographic recording medium HM. That is, the data can be recorded.

The objective lens 16 is supported so as to be movable by a focus actuator 17A in focusing directions (directions towards and away from the holographic recording medium HM). The objective lens 16, the focusing actuator 17A, and the mirror 15 are disposed so as to be integrally movable by a tracking actuator 17B in tracking directions (the radial directions of the holographic recording medium HM).

In addition, when data is reconstructed, a reference light beam is generated by the SLM 10. The generated reference light beam travels along the above-described light path and is emitted onto the holographic recording medium HM. By emitting the reference light beam in this manner, a diffraction light beam (a reconstructed image) in accordance with the interference fringes can be obtained from the holographic recording medium HM, as described above. The diffraction light beam serves as a returning light beam from the holographic recording medium HM. The returning light beam is made incident on the beam splitter 11 via the objective lens 16, the mirror 15, the dichroic mirror 14, the relay lens 13, and the relay lens 12. The returning light beam from the holographic recording medium HM is reflected by the beam splitter 11 and travels through a relay lens 18 and a relay lens 19. The returning light beam is then led to an image sensor 20, such as a CCD sensor or a CMOS sensor.

The image sensor 20 detects the light intensity pattern of the returning light beam (the reconstructed image). That is, by detecting the light intensity pattern, a readout signal for data recorded in the holographic recording medium HM can be obtained.

A data reconstruction unit 29 receives such a readout signal from the image sensor 20 and performs a predetermined decoding process. In this way, reconstructed data can be obtained.

In addition, the holographic recording and reconstructing apparatus 50 includes an optical system used for controlling the position of a recording and reconstructing point (a laser spot position) on the rotating holographic recording medium HM. More specifically, as shown in FIG. 8, the optical system that includes a sub-laser 21, a lens 22, a collimator lens 23, a beam splitter 24, a condenser lens 25, a lens 26, and a photodetector 27 is employed.

In order to control the position of the recording and reconstructing point using a tracking servo, recording and reconstructing apparatuses that support existing optical discs, such as CDs and DVDs, use a laser beam for recording and reconstructing data. The reason why such a common laser beam can be used for recording and reconstructing data and controlling the position of the recording and reconstructing point is because a recording layer of the optical discs has a clearly defined threshold value for recording power.

However, the characteristics of holographic recording media are different from those of existing optical discs. That is, currently, photopolymers are promising recording materials for the holographic recording medium HM, although photopolymers have no clearly defined threshold value for recording power. Accordingly even when, as in the case of existing optical discs, low-power laser light beam is emitted to a photopolymer disc, monomers may be changed to polymers in some portions. Thus, the recording performance of these portions is highly likely to be degraded.

Accordingly, in holographic recording and reconstructing methods, in order to perform position control, such as tracking servo control used for existing optical discs, a laser light beam having a wavelength different from that of a laser light beam used for recording and reconstructing data is used. Thus, reaction producing the polymer is reliably prevented.

As shown in FIG. 8, the sub-laser 21 is designed so as to emit a laser beam having a wavelength different from that of a laser light beam used for recording and reconstructing data. For example, the sub-laser 21 emits a red laser beam having a wavelength of about 650 nm, which is used for DVDs.

A light beam emitted from the sub-laser 21 is made incident on the dichroic mirror 14 via the lens 22, the collimator lens 23, and the beam splitter 24.

The dichroic mirror 14 has wavelength selectivity so as to transmit a recording and reconstructing laser beam emitted from the main laser 2 (the wavelength is about 405 nm) and reflect a position control laser beam emitted from the sub-laser 21 (the wavelength is about 650 nm). Accordingly, the position control laser beam made incident in the above-described manner is reflected by the dichroic mirror 14. Thereafter, the position control laser beam travels along the light path described above for the recording and reconstructing laser beam and passes through the objective lens 16. The position control laser beam is then emitted onto the holographic recording medium HM.

In the holographic recording medium HM, a first reflecting film is provided under a recording layer in which a hologram is recorded. The first reflecting film has wavelength selectivity so as to reflect the recording and reconstructing laser beam and pass the position control laser beam therethrough. A groove for position control is formed in an underlayer of the first reflecting film. A second reflecting film is provided under the groove layer.

Accordingly, the position control laser beam is emitted to the holographic recording medium HM, as described above. The position control laser beam passes through the first reflecting layer and reaches the groove layer located under the first reflecting layer. The position control laser beam that has reached the groove layer is then reflected by the underlying second reflecting film. The reflected light beam becomes a returning light beam and travels along the above-described path. The returning light beam is then led to the dichroic mirror 14.

Thereafter, the returning light beam for position control output from the holographic recording medium HM is reflected by the dichroic mirror 14 and is led to the beam splitter 24. The returning light beam is reflected by the beam splitter 24. Subsequently, the returning light beam travels through the condenser lens 25 and the lens 26. Finally, the returning light beam is made incident on the photodetector 27.

In this way, the returning light beam can be detected by the photodetector 27. Thereafter, a servo circuit (not shown) can perform position control, such as various servo control and access control of data at a specified address on the basis of a detection signal output from the photodetector 27.

In addition, in the hologram recording and reconstructing method, when, as shown in FIG. 8, data is recorded and reconstructed on and from the rotating holographic recording medium HM, a laser beam is scanned at predetermined intervals in such a way that the laser beam is emitted at the same location for a predetermined period of time. That is, by scanning the laser beam in this way, interference fringes are more reliably formed when data is recorded. In addition, when data is reconstructed, data can be more reliably read out by increasing the intensity of a detection light beam. Such a function of scanning a laser beam at predetermined intervals and emitting the laser beam onto the same location on the medium for a predetermined period of time is called an "image stabilization function".

As shown in FIG. 8, the existing holographic recording and reconstructing apparatus 50 includes the image stabilization function unit 53 for realizing such an image stabilization function.

The image stabilization function unit 53 includes an AOM 51, the AOD 4, and a control unit 52 that controls the AOM 51 and the AOD 4.

For example, the AOM 51 is driven using a high-frequency signal of a hundred and several tens of megahertz. The AOM 51 includes a device (an acousto-optic device) whose transmittance changes in accordance with a change in the amplitude of the high-frequency signal. That is, the change in transmittance realizes a shutter function.

Like the AOM 51, the AOD 4 is driven using a high-frequency signal. The AOD 4 includes an acousto-optic device that changes the deflection angle of a light beam in accordance with a change in the frequency of the high-frequency signal. The AOD 4 functions as a module that scans a laser light beam by controlling the deflection angle.

In the image stabilization function, in order to sequentially emit a laser beam onto predetermined locations for a predetermined period of time, a blanking period is necessary in which a laser spot is moved from one location to another location. If the laser beam is continuously emitted during this blanking period, the recording material reacts to no small extent. In particular, when data is recorded, a residual image caused by the movement of a laser spot may be added to a recorded hologram (a diffraction grating), thereby generating noise.

Therefore, in order to provide an image stabilization function, a unit (a shutter) for preventing reaction of a recording material by significantly decreasing the transmittance of a laser beam during the blanking period can be provided in addition to a unit for scanning a laser beam. More specifically, the existing image stabilization function unit 53 includes the AOM 51 serving as such a shutter.

As shown in FIG. 8, in order to realize the image stabilization function, the control unit 52 controls the AOM 51 and the AOD 4 so that the deflection angle and the transmittance of the laser beam are changed. More specifically, a saw-tooth wave driving signal is provided to the AOD 4 so that a scanning operation is performed at predetermined intervals. In addition, a square wave driving signal is provided to the AOM 51 so that a laser beam passes through the AOM 51 during the scanning period of the AOD 4 and the laser beam is blocked during the blanking period, which is a period between the scanning periods.

One of the related art documents is Japanese Unexamined Patent Application Publication No. 2002-341732.

SUMMARY OF THE INVENTION

As described above, the existing holographic recording and reconstructing apparatus 50 includes the AOM 51 serving as a shutter for realizing the image stabilization function. However, the AOM 51 serving as a shutter has the following problems.

That is, as described above, the AOM 51 provides a shutter function when being controlled in accordance with the amplitude of the high-frequency signal. At that time, when the amplitude of the high-frequency signal is changed, the applied voltage level is changed. The change in the applied voltage level causes a thermal change in the acousto-optic medium inside the AOM 51. The thermal change causes the laser beam that passes through the acousto-optic medium to be deviated. The deviation of the laser beam causes the hologram recording and reconstructing performance to be deteriorated.

In order to prevent the deviation of the optical axis of the laser beam occurring when the AOM 51 is used as a shutter, a mechanical shutter, for example, may be used in place of the AOM 51 (e.g., a film may be physically moved).

However, when a mechanical shutter is used, a slow response time is a problem. As compared with the case where the AOM 51 is used, a data recording and reconstructing speed is significantly decreased.

According to an embodiment of the present invention, an optical unit includes an acousto-optic deflector and drive control means. The drive control means controls the acousto-optic deflector by changing a frequency of a voltage applied to an acousto-optic medium of the acousto-optic deflector to a frequency in a first frequency range during a first period representing a deflection control period and changing the frequency of the voltage to a frequency in a second frequency range different from the first frequency range during a second period representing a transmittance control period.

According to another embodiment of the present invention, a holographic apparatus for recording or reconstructing data on a holographic recording medium that records data using interference fringes generated by a reference light beam and a signal light beam is provided. The holographic apparatus includes an optical system for leading a light beam emitted from a light source to the holographic recording medium, an acousto-optic deflector including an acousto-optic medium disposed on an optical path of the optical system, where the light beam emitted from the light source is incident on the acousto-optic medium, and drive control means. The drive control means controls the acousto-optic deflector by changing a frequency of a voltage applied to the acousto-optic medium of the acousto-optic deflector to a frequency in a first frequency range during a first period representing a deflection control period and changing the frequency of the voltage to a frequency in a second frequency range different from the first frequency range during a second period representing a transmittance control period.

Figure 6:
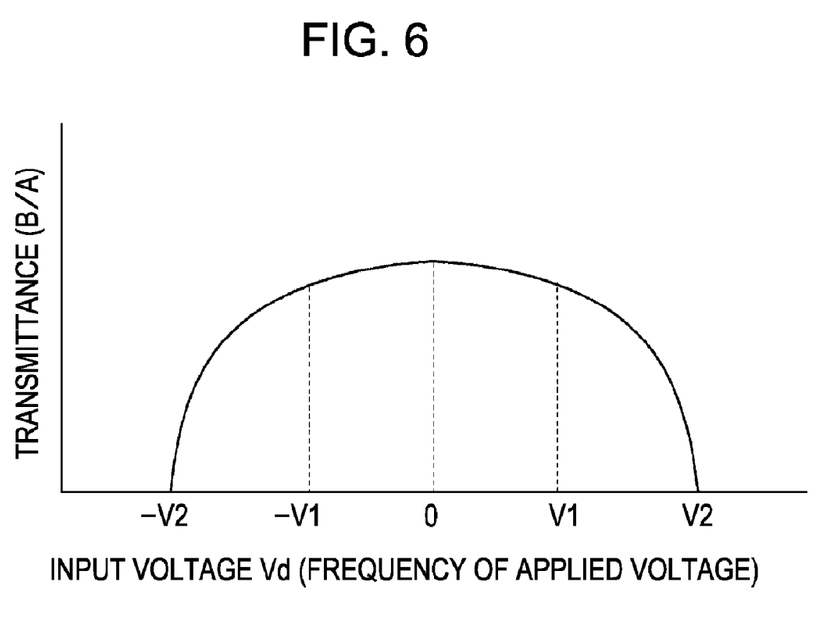
FIG. 6 illustrates the transmittance change characteristic of the AOD with respect to an input voltage (or the frequency of an applied voltage)

The acousto-optic deflector (AOD) includes an acousto-optic medium having a photoelastic effect (an effect that changes the index of refraction when ultrasonic sound waves are applied to the medium). The variation characteristic of such an acousto-optic medium with respect to a frequency of the applied voltage is schematically illustrated in FIG. 6. That is, the transmittance is maximized at a certain frequency of the applied voltage, and the transmittance rarely changes within a predetermined range, the center of which is the certain frequency of the applied voltage. However, the transmittance abruptly decreases outside the predetermined range.

When, as in existing cases, the acousto-optic deflector is used for a deflector, the frequency range in which the transmittance rarely changes may be used. Accordingly, for existing AODs serving as deflectors, the frequency of the applied voltage is controlled within a frequency range used for deflection control (within a first frequency range).

According to the embodiments of the present invention, an AOD is driven so that the frequency of a voltage applied to the acousto-optic medium is changed not only within the frequency range used for deflection control but also within a frequency range in which the transmittance abruptly decreases (within a second frequency range). By changing the frequency of the voltage applied to the acousto-optic medium to a frequency within the second frequency range, the transmittance can be significantly decreased, as compared with that in the case of deflection control. That is, by selecting a frequency in the second frequency range at which the transmittance is minimized in accordance with the characteristic of the acousto-optic medium, the amount of transmitted light beam can be minimized (to zero, for example). In this way, the AOD can be used as a shutter in addition to a deflector.

As described above, according to the embodiments of the present invention, a shutter function is realized by controlling the frequency of a voltage applied to an acousto-optic medium having a photoelastic characteristic. That is, the necessity of an AOM that provides a shutter function by changing the amplitude of the applied voltage can be removed, and therefore, the level of the applied voltage can be maintained constant.

As a result, according to the embodiments of the present invention, a shutter function can be provided without causing a thermal change in an acousto-optic medium, and therefore, an optical axis shift that may occur when an AOM is used can be prevented.

In addition, since the shutter function is realized by using a photoelastic effect of an acousto-optic medium, a shutter having a significantly high-speed response can be achieved, as compared with a mechanical shutter.

In particular, in the holographic apparatus including the optical unit according to the above-described embodiment, when, in order to realize an image stabilization function, an emitted beam is scanned at predetermined intervals so that a difference between relative speeds of a rotating holographic recording medium and a beam spot is zero, the AOD can provide a deflection angle changing function and a shutter function that are necessary for the image stabilization function. Accordingly, another component, such as an AOM or a mechanical shutter, that is necessary for existing holographic apparatuses is not necessary. Therefore, the number of components that are necessary for realizing the image stabilization function can be reduced. As a result, the size of the apparatus and the cost of manufacturing the apparatus can be reduced.

In addition, if a shutter function is provided without using an AOM, a shift of the optical axis due to a temperature change can be prevented, as described above. Accordingly, a shift of the position of data recording/reconstructing point can be prevented, and therefore, a reliable data recording/reconstructing operation can be provided.

In addition, a high-speed data recording and reconstructing operation due to the high-speed shutter operation can be obtained, as compared with in the case where a mechanical shutter is used.

DESCRIPTION OF THE PREFERRED EMBODIMENTS

Various exemplary embodiments of the present invention are described below with reference to the accompanying drawings.

Figure 1:
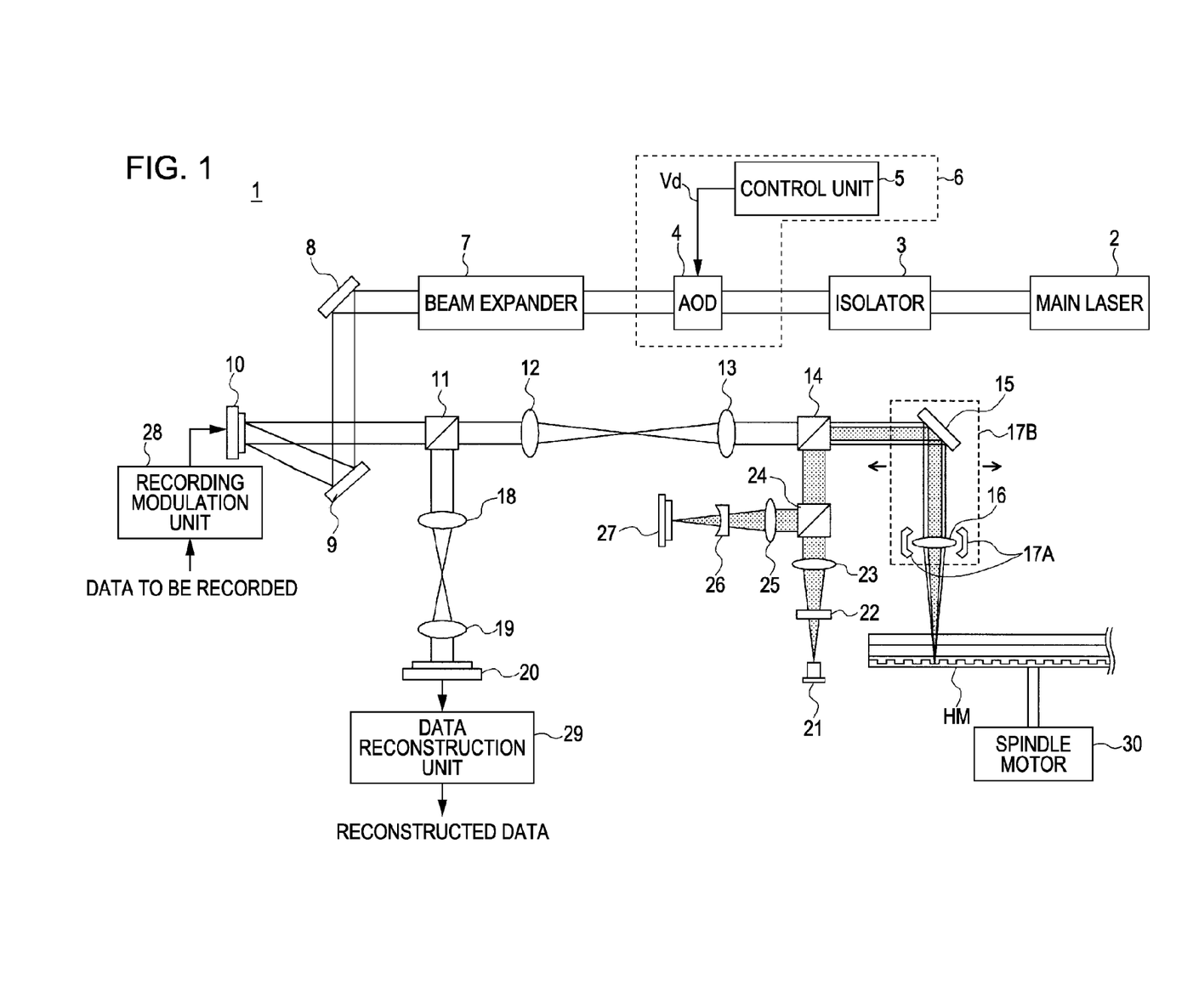
FIG. 1 is a block diagram of an exemplary internal configuration of a holographic apparatus according to an embodiment of the present invention.

FIG. 1 is a block diagram illustrating an exemplary internal configuration of a hologram recording and reconstructing apparatus 1, which is a holographic apparatus according to the present embodiment. Note that FIG. 1 illustrates only components of an optical system of the hologram recording and reconstructing apparatus 1. The other components are not shown in FIG. 1.

According to the present embodiment, a hologram recording and reconstructing method called a "coaxial method" is employed. That is, a signal light beam and a reference light beam are disposed on the same axis. These two light beams are emitted onto a holographic recording medium HM so that data is recorded using interference fringes. When data is reconstructed, the reference light beam is emitted onto the holographic recording medium HM so that the data recorded using the interference fringes is reconstructed.

As shown in FIG. 1, the holographic recording medium HM has a disc shape. The holographic recording medium HM includes a recording layer in which a hologram is recorded and an underlying groove layer in which a groove is formed for recording information used for position control.

As can be seen from FIG. 1, in the present embodiment, the holographic recording medium HM is of a reflective type. In such a reflective holographic recording medium HM, a reflecting film is provided to both the recording layer and the groove layer. More specifically, a first reflecting film is provided as an underlayer of the recording layer. A second reflecting film is provided under the groove layer underlying the first reflecting film.

The first reflecting layer underlaying the recording layer has wavelength selectivity. Thus, a hologram recording and reconstructing laser beam emitted from a light source (a main laser 2) is reflected by the first reflecting film. In contrast, a position control laser beam emitted from a light source (a sub-laser 21) passes through the first reflecting film and can reach the groove layer underlying the first reflecting film.

In the hologram recording and reconstructing apparatus 1, the holographic recording medium HM is placed at a predetermined location and is rotated by a spindle motor 30. A recording and reconstructing laser beam is emitted from the main laser 2 onto the rotating holographic recording medium HM. Thus, the hologram recording and reconstructing apparatus 1 records and reconstructs data using the recording and reconstructing laser beam.

For example, a laser diode having an external resonator is used for the main laser 2. The laser beam emitted from the main laser 2 has a wavelength of, for example, about 405 nm.

The laser beam emitted from the main laser 2 is made incident on a beam expander 7 via the isolator 3 and an AOD 4 disposed inside an image stabilization function unit 6 described below. The beam expander 7 controls the diameter of the incident laser beam.

As shown in FIG. 1, the laser beam output from the beam expander 7 travels via the mirror 8 and the mirror 9 and is made incident on an SLM 10.

The SLM 10 performs spatial light modulation (e.g., spatial light intensity modulation) on the incident light beam. In this example, the SLM 10 is of a reflective type. For example, the SLM 10 includes a spatial light modulator of a diffractive type, such as a reflective liquid crystal panel or a digital micromirror device (DMD) (trade name).

By performing spatial light intensity modulation on the incident light beam, the SLM 10 can generate a signal light beam and a reference light beam when recording data and generate a reference light beam when reconstructing data.

Figure 2:
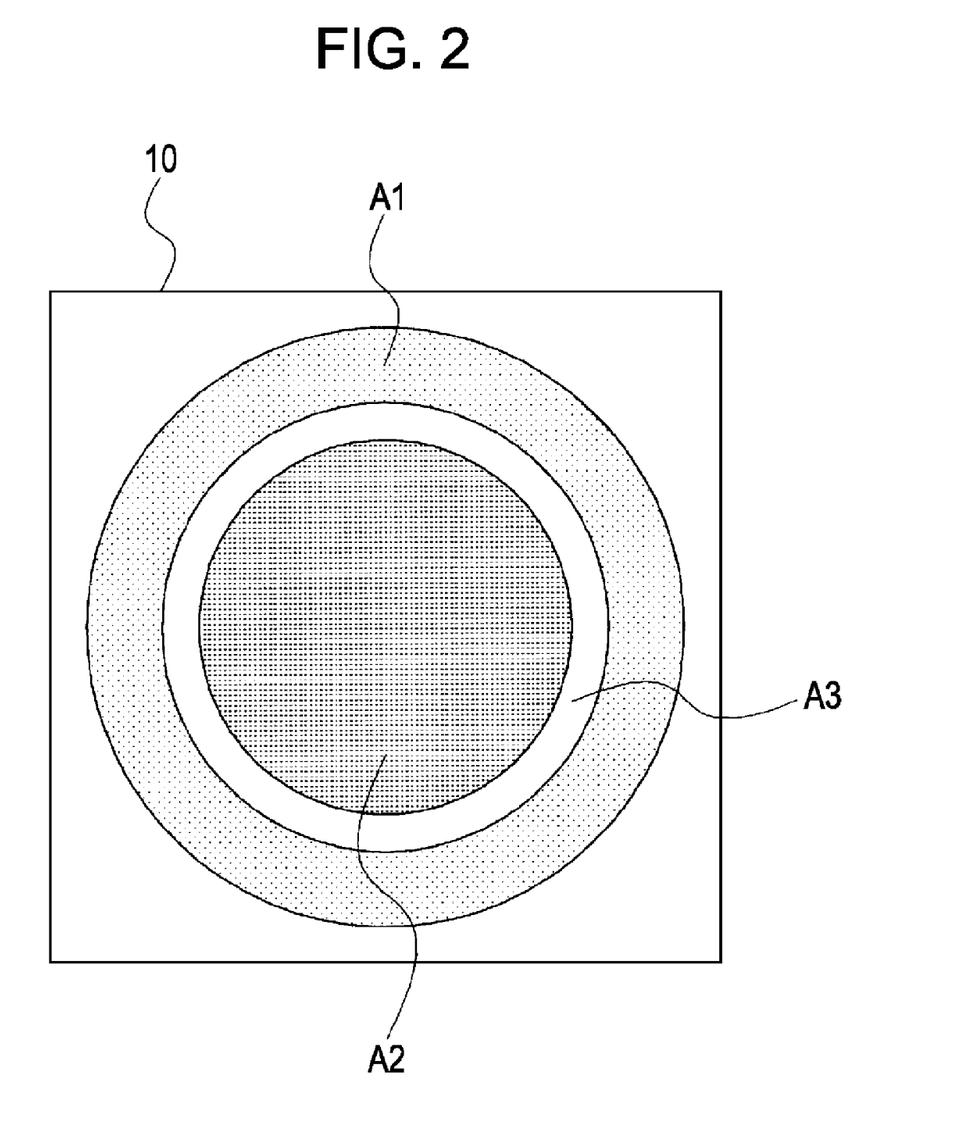
FIG. 2 illustrates areas set in a spatial light modulator.

In order to generate a signal light beam and a reference light beam, as shown in FIG. 2, the SLM 10 has a reference light beam area A1, a signal light beam area A2, and a gap area A3. That is, these areas are set for all of the effective pixels of the SLM 10.

In this example for a coaxial method, a circular signal light beam area A2 is formed at the center of the SLM 10, a ring-shaped gap area A3 is formed so as to surround the signal light beam area A2, and a ring-shaped reference light beam area A1 is formed so as to surround the gap area A3. Note that the gap area A3 is provided in order to prevent the occurrence of noise caused by interference between light beams passing through the reference light beam area A1 and the signal light beam area A2.

Referring back to FIG. 1, each of the pixels of the SLM 10 is driven on the basis of a driving signal supplied from the recording modulation unit 28. Thus, the SLM 10 generates a signal light beam and a reference light beam when recording data and generates a reference light beam when reconstructing data.

When recording data, the recording modulation unit 28 sets a driving signal value for each of the pixels so that a pixel pattern (e.g., a on/off pattern of each pixel) in the signal light beam area A2 of the SLM 10 is changed to a pattern corresponding to the input data to be recorded. At the same time, the recording modulation unit 28 sets a pixel pattern in the reference light beam area A1 to a predetermined pattern. In addition, the recording modulation unit 28 sets driving signal values for all of the pixels in the other areas including the gap area A3 so that all of the pixels are turned off. The recording modulation unit 28 then supplies such driving signals to the SLM 10. In this way, when data is recorded, the SLM 10 outputs a signal light beam having a light intensity pattern in accordance with the data to be recorded and a reference light beam having a predetermined light intensity pattern.

Furthermore, when data is reconstructed, the recording modulation unit 28 sets the driving signal values and drives the pixels of the SLM 10 so that only a pixel pattern in the reference light beam area A1 is a predetermined pattern and all of the pixels of the other areas are turned off. Thus, only a reference light beam is output from the SLM 10.

The light beam subjected to the spatial light modulation in the SLM 10 is made incident on the beam splitter 11, as shown in FIG. 1. The beam splitter 11 passes the light beam output from the SLM 10 therethrough.

The laser light beam that has passed through the beam splitter 11 travels via the relay lens 12 and the relay lens 13 and is made incident on the dichroic mirror 14.

The dichroic mirror 14 has wavelength selectivity. The dichroic mirror 14 allows a recording and reconstructing laser beam emitted from the main laser 2 and input via the relay lens 13 to pass therethrough. In contrast, the dichroic mirror 14 reflects a position control laser beam emitted from the sub-laser 21 described below.

Accordingly, the laser beam output from the relay lens 13 passes through the dichroic mirror 14 and is reflected by the mirror 15. Thereafter, the laser beam is emitted onto the holographic recording medium HM via the objective lens 16.

The objective lens 16 is supported so as to be movable by a focus actuator 17A in a focusing direction (a direction towards and away from the holographic recording medium HM). The objective lens 16, the focusing actuator 17A, and the mirror 15 are disposed so as to be integrally movable by a tracking actuator 17B in the tracking directions (the radial directions of the holographic recording medium HM).

A servo circuit (not shown) supplies a focusing drive signal and a tracking drive signal to the focusing actuator 17A and the tracking actuator 17B, respectively. The objective lens 16 is moved in the focusing direction and the tracking direction in accordance with the driving signals. Thus, servo operations for focusing and tracking and an operation such as track jumping can be achieved. In this example, the tracking actuator 17B can move the objective lens 16 by about 0.5 mm in the tracking direction.

In addition, in practice, a sliding mechanism (not shown) is provided in order to change the relative positions of an optical pickup including the objective lens 16 and the holographic recording medium HM in the tracking direction.

Here, a signal light beam and a reference light beam are generated from the recording and reconstructing laser beam emitted from the main laser 2 through the above-described spatial light modulation performed by the SLM 10 when data is recorded. That is, when data is recorded, by emitting a laser beam using the above-described optical path, a signal light beam and a reference light beam are emitted to the holographic recording medium HM. By emitting the signal light beam and the reference light beam onto the holographic recording medium HM in this manner, interference fringes generated by these light beams can be recorded in the above-described recording layer.

When data is reconstructed, only a reference light beam is generated by the SLM 10. This reference light beam is emitted to the holographic recording medium HM via the above-described optical path. In this way, by emitting the reference light beam onto the holographic recording medium HM, a diffraction light beam (a reconstructed image) in accordance with the interference fringes can be obtained. The reconstructed image obtained in this manner serves as a returning light beam from the first reflecting film formed in the holographic recording medium HM and returns to the apparatus side.

The returning light beam is collimated by the objective lens 16 and is reflected by the mirror 15. Thereafter, the returning light travels through the dichroic mirror 14, the relay lens 13, and the relay lens 12 and is made incident on the beam splitter 11.

The beam splitter 11 is configured so as to reflect the returning light beam output from the holographic recording medium HM. Accordingly, as shown in FIG. 1, the returning light beam is made incident on the image sensor 20 via the relay lens 18 and the relay lens 19.

For example, a CCD sensor or a CMOS sensor is used for the image sensor 20. The image sensor 20 receives the returning light beam (a reconstructed image) output from the holographic recording medium HM and made incident thereon in the above-described manner. The image sensor 20 then converts the returning light beam to an electrical signal. Thus, an image signal is obtained. Such an image signal is based on the light intensity pattern (i.e., a 0/1 pattern) supplied to the signal light beam when data is recorded. That is, the image signal detected by the image sensor 20 in this manner serves as a readout signal of data recorded on the holographic recording medium HM.

The data reconstruction unit 29 receives the readout signal obtained from the image sensor 20 in the above-described manner. The data reconstruction unit 29 then performs predetermined signal processing (a decoding process) on the readout signal so as to reconstruct the recorded data having a binary pattern (a 0/1 pattern).

In order to reconstruct such data recorded in the binary pattern, signal processing is performed on the data read out from the image sensor 20 for identifying whether data of each of the pixels of the SLM 10 is "0" or "1". Any method among a variety of methods for reconstructing "0"/"1" recorded data from the output of the image sensor 20 can be employed.

In addition, as shown in FIG. 1, in the holographic apparatus, the optical system used for controlling the position of the data recording/reconstructing point by means of the recording and reconstructing laser beam includes the sub-laser 21, the lens 22, the collimator lens 23, the beam splitter 24, the condenser lens 25, the lens 26, and the photodetector 27.

The sub-laser 21 emits a laser beam having a wavelength different from that of the recording and reconstructing laser beam emitted from the main laser 2 serving as a light source. For example, the sub-laser 21 emits a red laser beam having a wavelength of about 650 nm, which is also used for DVDs.

A light beam emitted from the sub-laser 21 passes through the lens 22, the collimator lens 23, and the beam splitter 24 and is made incident on the dichroic mirror 14.

As noted earlier, the dichroic mirror 14 reflects the position control laser beam emitted from the sub-laser 21. Accordingly, the position control laser beam made incident in this manner is reflected by the dichroic mirror 14. Thereafter, the position control laser beam is emitted onto the holographic recording medium HM via the mirror 15 and the objective lens 16.

The position control laser beam emitted onto the holographic recording medium HM reaches a groove layer underlying the first reflecting film, since the first reflecting film has wavelength selectivity. The light beam that has reached the groove layer is reflected by the second reflecting film underlying the groove layer. The reflected light beam serves as a returning light beam for position control. The returning light beam is made incident on the apparatus side via the objective lens 16.

The returning light beam for position control input via the objective lens 16 is led to the dichroic mirror 14 via the mirror 15. The dichroic mirror 14 reflects the returning light beam for position control so that the returning light beam is led to the beam splitter 24. The beam splitter 24 reflects the returning light beam. As a result, the returning light beam is made incident on the photodetector 27 via the condenser lens 25 and the lens 26.

The photodetector 27 acquires, on the basis of the returning light beam from the holographic recording medium HM, a detection signal used for controlling the recording/reconstructing position of the recording and reconstructing laser beam emitted from the main laser 2 serving as a light source. For example, a tracking error signal used for tracking servo control and a focus error signal used for focus servo control are generated on the basis of the detection signal of the photodetector 27.

Note that a structure for recording and reconstructing position control (including focus control and control for accessing a specified address) performed on the basis of the detection signal of the photodetector 27 is not shown in FIG. 1. However, a structure for performing recording and reconstructing position control on the basis of emission of a laser beam emitted from the sub-laser 21 serving as a light source can be the same as that used for existing optical discs, such as CDs, DVDs, and Blu-ray Discs (BDs) (trade name). Such a structure for recording and reconstructing position control is not a key feature of the image stabilization function of the present embodiment. Therefore, any structure for recording and reconstructing position control can be used.

Image Stabilization Function

As mentioned earlier, when, as in the present embodiment, a hologram is recorded and reconstructed onto and from the holographic recording medium HM rotatingly driven, a laser light is scanned at predetermined intervals in such a way that the laser light is emitted onto the same location of the holographic recording medium HM for a predetermined period of time (an image stabilization function). That is, by performing such an image stabilizing operation, interference fringes can be reliably formed when data is recorded. In addition, when data is reconstructed, the amount of detection light can be increased, and therefore, the interference fringes can be reliably read out.

According to the present embodiment, in order to realize such an image stabilization function, the hologram recording and reconstructing apparatus 1 includes an image stabilization function unit 6, as shown in FIG. 1. As shown in FIG. 1, the image stabilization function unit 6 includes an AOD 4 and a control unit 5 for controlling the AOD 4. That is, the image stabilization function unit 6 has a configuration the same as that of the image stabilization function unit 53 without the AOM 51 (refer to FIG. 8).

In the image stabilization function unit 6 according to the present embodiment, the control unit 5 controls the AOD 4 so that the AOD 4 functions as a deflector and a shutter. In this way, an image stabilization function can be realized.

A method for controlling the AOD 4 in this manner is described below with reference to FIGS. 3 to 7.

Figure 3:
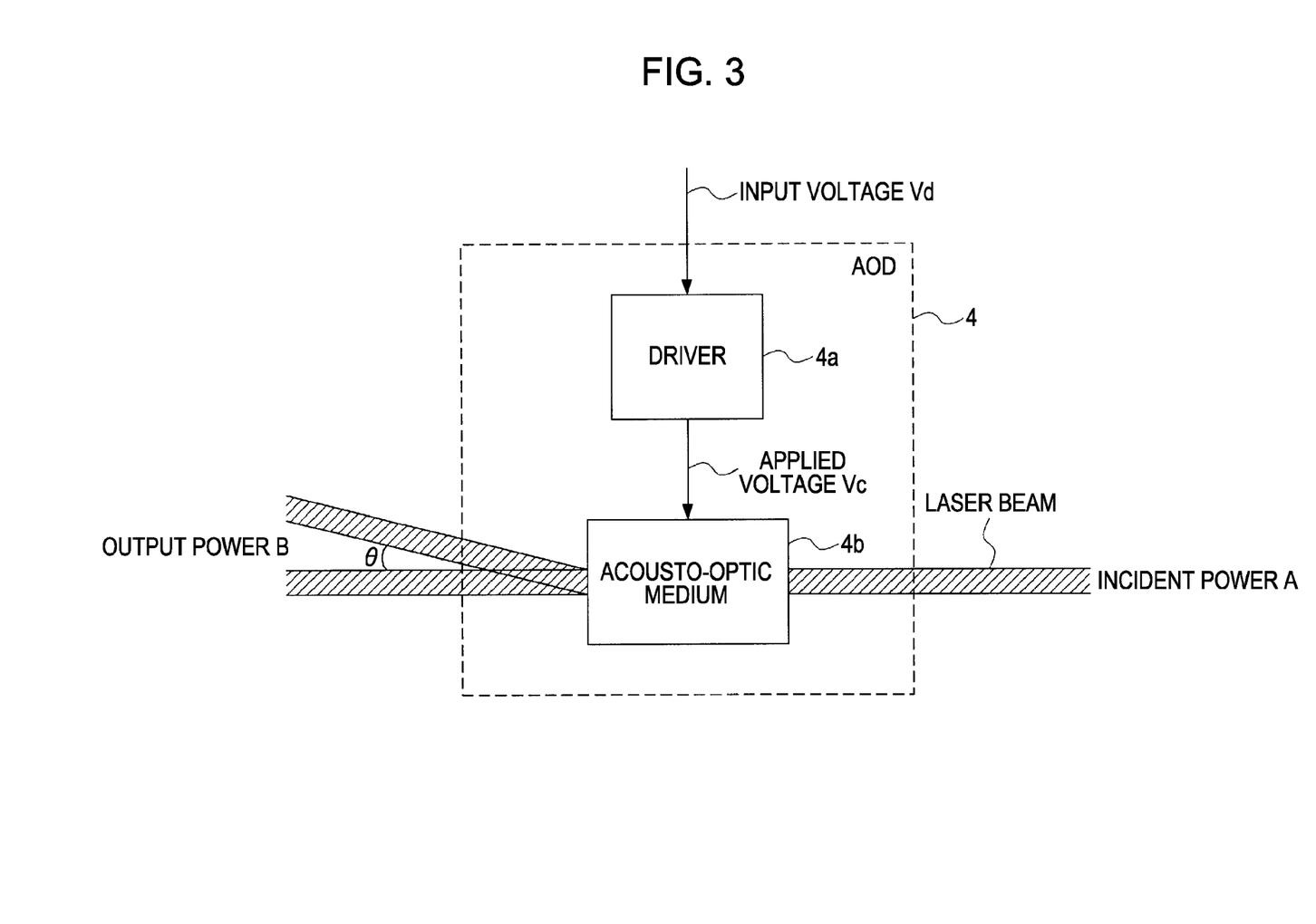
FIG. 3 illustrates an exemplary internal configuration of an acousto-optic deflector (AOD)

FIG. 3 illustrates an exemplary internal configuration of the AOD 4.

As shown in FIG. 3, the AOD 4 includes a driver 4a to which the control unit 5 shown in FIG. 1 supplies an input voltage Vd and an acousto-optic medium 4b driven by a voltage Vc applied by the driver 4a.

It is noted that the acousto-optic medium 4b of the AOD 4 has a photoelastic effect. By changing the frequency of the voltage Vc, which is a relatively high frequency, the index of refraction of an internal material can be changed. A change in the index of refraction changes the deflection angle of a light beam.

In the AOD 4, the driver 4a changes the frequency of the voltage Vc having a constant amplitude in accordance with the input voltage Vd serving as a frequency instruction signal. Thus, a deflection angle θ of the incident light beam can be changed.

For confirmation, the relationship between the input voltage Vd input to the AOD 4 (the driver 4a) and the deflection angle θ of the AOD 4 (the acousto-optic medium 4b) is described next with reference to FIGS. 4 and 5.

Figure 4:
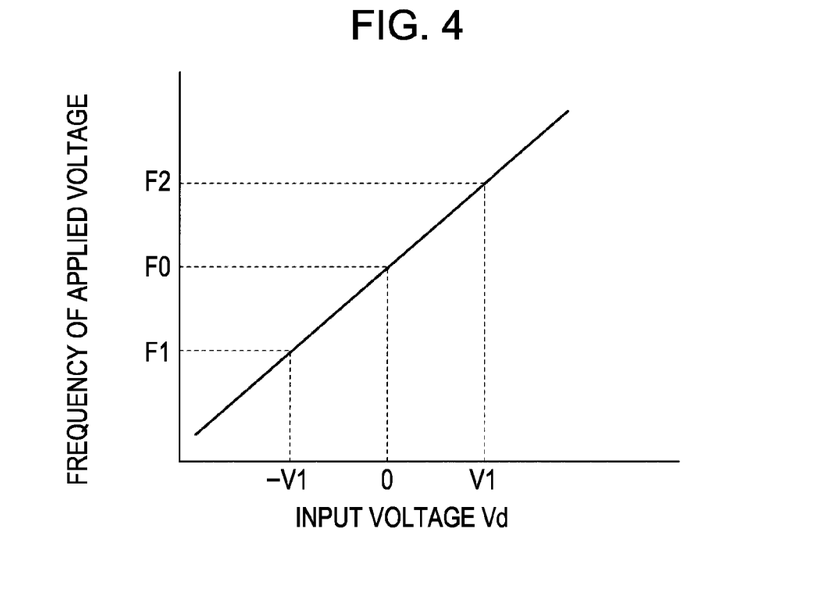
FIG. 4 illustrates the modulation characteristic of the AOD when the AOD modulates the frequency of an applied voltage in accordance with an input voltage.

FIG. 4 illustrates the frequency modulation characteristic of the AOD 4. The abscissa represents the input voltage Vd input to the AOD 4, and the ordinate represents the frequency of the voltage applied to the acousto-optic medium 4b. Thus, the relationship between the input voltage Vd and the frequency of the applied voltage is illustrated. As can be seen from FIG. 4, the frequency of the voltage Vc applied to the acousto-optic medium 4b is proportional to the level of the input voltage Vd input to the driver 4a. That is, the driver 4a is designed so as to apply the voltage Vc in accordance with a frequency proportional to the level of the input voltage Vd to the acousto-optic medium 4b.

Figure 5:
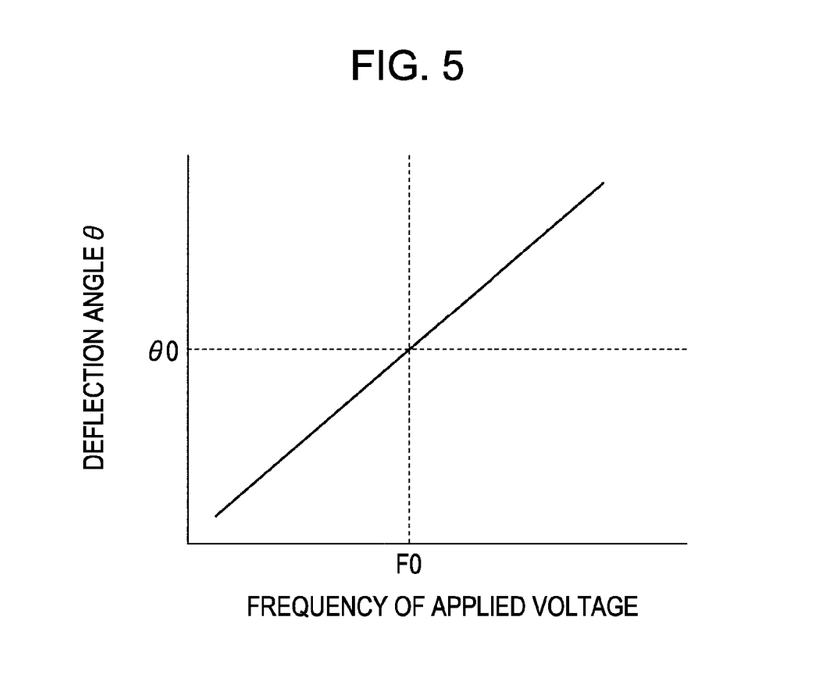
FIG. 5 illustrates the deflection angle change characteristic of the AOD with respect to the frequency of an applied voltage.

FIG. 5 illustrates the deflection characteristic of the AOD 4. The abscissa represents the frequency of the applied voltage, and the ordinate represents the deflection angle θ. Thus, the relationship between the frequency of the applied voltage and the deflection angle θ is illustrated. As can be seen from FIG. 5, when the frequency of the voltage Vc applied to the acousto-optic medium 4b is a reference frequency F0, the deflection angle θ is 0. As the frequency of the voltage Vc increases from the reference frequency F0, the deflection angle θ increases in the forward direction. In contrast, as the frequency of the voltage Vc decreases from the reference frequency F0, the deflection angle θ increases in the opposite direction.

FIG. 6 illustrates a variation characteristic of the transmittance of the AOD 4 with respect to the input voltage Vd.

In FIG. 6, the ordinate represents the transmittance. The transmittance is expressed by B/A, where A represents the power of a light beam made incident on the acousto-optic medium 4b shown in FIG. 3, and B represents the power of a light beam output from the acousto-optic medium 4b. In addition, the abscissa represents the input voltage Vd. As described in FIGS. 4 and 5, the level of the input voltage Vd can be replaced with the frequency of the voltage applied to the acousto-optic medium 4b.

As can be seen from FIG. 6, the transmittance of the AOD 4 is maximized at a certain voltage Vd (Vd=0). In the range of the input voltage Vd from −V1 to V1, the center of which is Vd of 0, the transmittance rarely changes. However, outside this range from −V1 to V1, the transmittance abruptly decreases.

That is, from a point of view of the frequency of the applied voltage, the transmittance is maximized at a reference frequency corresponding to the input voltage Vd of 0. In a predetermined range, the center of which is the reference frequency, the transmittance rarely changes. Outside this frequency range, however, the transmittance abruptly decreases.

In the present embodiment, the transmittance of the AOD 4 is maximized at a reference frequency of about 150 MHz.

If, as in existing cases, the AOD 4 is used as a deflector, the frequency range in which the transmittance is not decreased may be used. Accordingly, in order to realize an image stabilization function, a frequency range (a first frequency range) corresponding to the range of the input voltage Vd from −V1 to V1 is used as a frequency range of a voltage used for deflection control during a period for scanning a laser beam. That is, in the scanning period (the deflection control period) of a laser beam, the level of the input voltage Vd is controlled so that the frequency of the applied voltage Vc is changed within the first frequency range.

According to the present embodiment, in a blanking period (a shutter period, i.e., a transmission control period) between the above-described scanning periods that is necessary for providing the image stabilization function, the frequency of the applied voltage Vc is changed to the frequency in a second frequency range different from the first frequency range. That is, such a second frequency range is a frequency range corresponding to a range of Vd<−V1 or Vd>V1 shown in FIG. 6 in which the transmittance is abruptly decreased. More specifically, the frequency of the applied voltage Vc is changed to the frequency corresponding to a point of Vd=−V2 or Vd=V2 at which the transmittance is minimized (0 in this case).

Figure 7A:
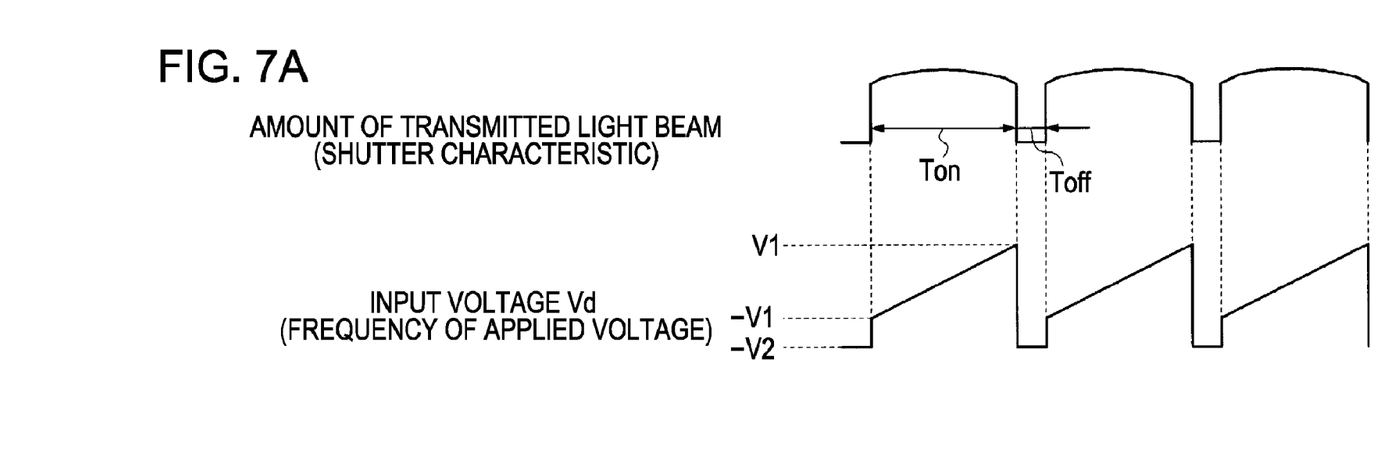
FIGS. 7A and 7B illustrate examples of control of the AOD according to the embodiment.
Figure 7B:
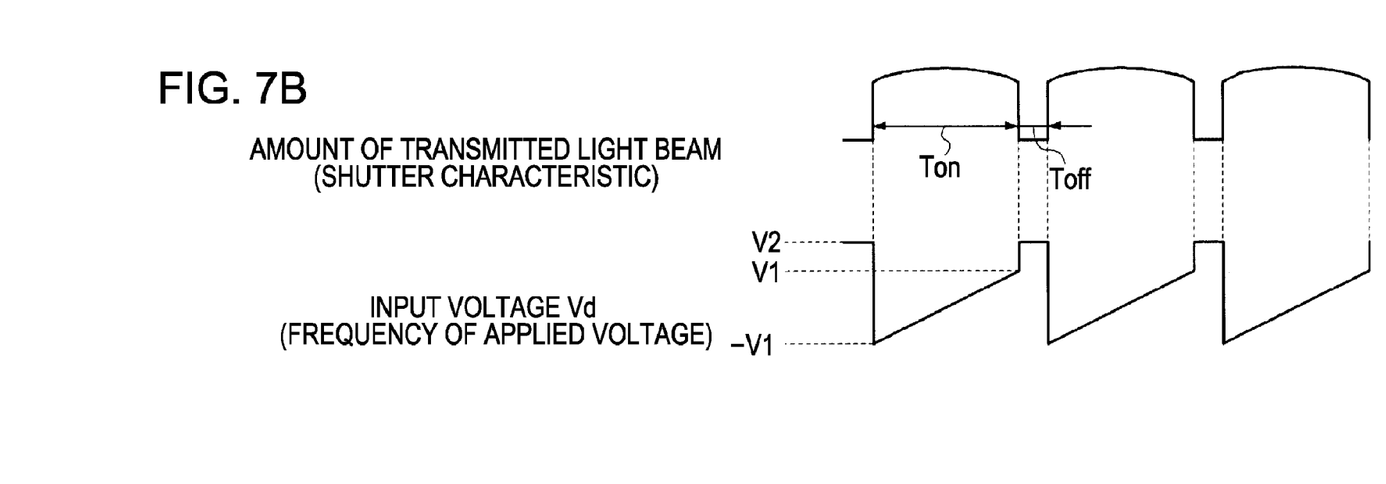

FIGS. 7A and 7B illustrate an actual example of control of the input voltage Vd performed by the control unit 5.

In FIGS. 7A and 7B, the transmitted amount of a light beam (the shutter characteristic) of the acousto-optic medium 4b is illustrated in addition to the waveform of the input voltage Vd input from the control unit 5 to the driver 4a. In FIGS. 7A and 7B, a period Ton represents a scanning period in which a laser beam is scanned so as to be emitted onto the same location on the holographic recording medium HM for a certain period of time. A period Toff represents a shutter period in which shutter control is performed so that the transmittance is significantly decreased in order to prevent reaction of the recording material while a laser spot is moving to the next irradiation point. To realize an image stabilization function, the scanning period and the shutter period are made to alternately appear.

More specifically, FIG. 7A illustrates a deflection and shutter operation example 1 in which the input voltage Vd=−V2 during a shutter period.

In this operation example 1, during the scanning period, the level of the input voltage Vd is continuously changed in the range from −V1 to V1. In contrast, during the shutter period, the input voltage Vd is maintained at a constant voltage level −V2.

FIG. 7B illustrates a deflection and shutter operation example 2 in which the input voltage Vd=V2 during a shutter period.

In this operation example 2, during the scanning period, the level of the input voltage Vd is continuously changed in the range from −V1 to V1, as in the operation example 1. However, during the shutter period, the level of the input voltage Vd is maintained at a constant voltage V2.

Note that the slope of the waveform of the input voltage Vd during the period Ton representing a scanning period determines the scanning speed of the laser beam. That is, as the slope increases, a change ratio of the frequency of the applied voltage per unit of time increases. Therefore, the scanning speed of the laser beam increases. However, as the slope decreases, the change ratio of the frequency of the applied voltage per unit of time decreases. Therefore, the scanning speed of the laser beam decreases.

The control unit 5 determines the slope of the input voltage Vd during the period Ton so as to obtain the laser scanning speed that allows the laser beam to follow the same point on the rotating holographic recording medium HM. Furthermore, the control unit 5 sets the length of the period Ton representing the scanning period to a predetermined time length. In this way, the control unit 5 can control the AOD 4 so that the laser beam is emitted onto the same location on the holographic recording medium HM for a predetermined period of time.

More specifically, the control unit 5 sets the slope of the input voltage Vd during the period Ton using, for example, the following method.

For example, when the holographic recording medium HM is rotated at a constant linear speed, the rotation speed information of the spindle motor 30 is input to the control unit 5. The control unit 5 then controls the slope of the input voltage Vd so that the laser scanning speed is equal to a speed indicated by the rotation speed information.

However, when the linear speed is not constant, the rotation speed information of the spindle motor 30 and information indicating the current recording and reconstructing position (or the position in the radial direction) are input to the control unit 5. The control unit 5 then determines the slope of the input voltage Vd on the basis of the information so that the laser scanning speed that allows the laser beam to follow the same position on the holographic recording medium HM is obtained.

In the example shown in FIGS. 7A and 7B, in order to continuously change the input voltage Vd during the scanning period, the level of the input voltage Vd is changed from −V1 to V1. However, in accordance with the rotational direction of the holographic recording medium HM, the input voltage Vd may be changed from V1 to −V1.

In the present embodiment, the frequency of the voltage applied to the AOD 4 when the input voltage Vd=−V2 or the input voltage Vd=V2 is the reference frequency 150 MHz, which maximizes the above-described transmittance, ±70 MHz.

Note that it is desirable that the frequency of the applied voltage determined for the shutter period is the frequency that minimizes the transmittance of the acousto-optic medium 4b since the shutter period is provided for preventing reaction of the recording material of the holographic recording medium HM. However, in order to achieve this goal, any frequency of the applied voltage that provides a transmittance that can limit the laser power to a value for which the recording material is not reactive can be used. That is, the frequency of the applied voltage is not limited to the frequency that minimizes the transmittance of the acousto-optic medium 4b.

As described above, according to the present embodiment, the hologram recording and reconstructing apparatus 1 allows the AOD 4 to function as a deflector and a shutter by changing the frequency of the voltage applied to the acousto-optic medium 4b disposed in the AOD 4 to a frequency in the first frequency range during a scanning period and changing the frequency of the voltage applied to the acousto-optic medium 4b to a frequency in the second frequency range during a shutter period (more specifically, a frequency that minimizes the transmittance).

In this case, the shutter function is not realized by changing the amplitude of the applied voltage, as in the case for existing AOMs, but is realized by changing only the frequency while maintaining the applied voltage at a constant level. Accordingly, the shutter function is realized without the temperature of the acousto-optic medium 4b being changed. As a result, a shift of the optical axis that occurred when an AOM was used can be prevented.

In addition, such a shutter function using the AOD 4 is realized by using the photoelastic effect of the acousto-optic medium 4b. Accordingly, a shutter having a significantly high-speed response can be achieved, as compared with the case in which a mechanical shutter is used.

Consequently, by using the hologram recording and reconstructing apparatus 1 according to the present embodiment, a shift of a recording and reconstructing position that occurs when an AOM is used can be prevented. Thus, a reliable data recording and reconstructing operation can be obtained. In addition, a high-speed data recording and reconstructing operation due to the high-speed shutter operation can be obtained.

Furthermore, in the hologram recording and reconstructing apparatus 1 according to the present embodiment, the AOD 4 alone can provide a deflection control function and a shutter function that are necessary for realizing the image stabilization function. Accordingly, another component, such as an AOM or a mechanical shutter, that is necessary for existing hologram recording and reconstructing apparatuses is not necessary. Therefore, the number of components that are necessary for realizing the image stabilization function can be reduced. As a result, the size of the apparatus and the cost of manufacturing the apparatus can be reduced.

Modifications

While the present invention has been described with reference to an exemplary embodiment, the present invention is not limited to the exemplary embodiment.

For example, the configuration of the optical system shown in FIG. 1 is only an example. The configuration of the optical system should not be limited thereto. For example, while the exemplary embodiment has been described with reference to a reflective SLM for generating a signal light beam and a reference light beam, a transmissive SLM can be used in place of the reflective SLM. In such a case, the SLM may be configured so as to include a transmissive liquid crystal panel.

In addition, while the exemplary embodiment has been described with reference to a configuration that supports a reflective holographic recording medium HM, the embodiment can be applied to a configuration designed for supporting a transmissive holographic recording medium HM.

In such a case, the beam splitter 11 for leading a reference light beam to an image sensor can be removed from a data reconstruction sub-system. Thus, a reconstruction image obtained when a reference light beam is emitted passes through the holographic recording medium HM. Therefore, by providing another objective lens (a condenser lens) on the opposite side of the holographic recording medium HM from the emission point of a laser beam, the reconstruction image serving as a transmission light beam can be collected by the objective lens and led to the image sensor.

Note that even when such a transmissive holographic recording medium HM is used, the basic operation of recording and reconstructing data is the same as that for a reflective holographic recording medium HM. That is, in order to record data, a signal light beam and a reference light beam are emitted onto the holographic recording medium HM, and data is recorded using interference fringes of the two beams. In order to reconstruct the data, the reference light beam is emitted to the holographic recording medium HM, and an obtained reconstruction image is detected by using an image sensor so that the data is reconstructed.

In the description above, the embodiment of the present invention is applied to a recording and reconstructing apparatus capable of recording and reconstructing data on and from the holographic recording medium HM that allows the data to be recorded thereon using interference fringes of a reference light beam and a signal light beam. However, the embodiment can be suitably applied to a recording apparatus capable of only recording data or a reconstructing apparatus capable of only reconstructing data.

In addition, in the description above, the optical unit of the embodiment is applied to a holographic apparatus that records and reconstructs data on and from the holographic recording medium HM. However, the optical unit of the embodiment can be suitably applied to any case in which deflection angle control and transmission control are performed in different periods on a time axis using an AOD. Thus, the use of the optical unit of the embodiment is not limited to the above-described particular case.

Furthermore, while the embodiment above has been described with reference to the case in which the AOD provides both deflection control function and shutter function, the AOD may provide only the shutter function. In such a case, in the first period in which a light beam is allowed to pass through the AOD, the frequency of the voltage applied to the acousto-optic medium is set to a constant value at the reference frequency at which the transmittance is maximized (or the reference frequency F0 at which a deflection angle θ=0). In addition, in the second period in which the light beam is blocked, the frequency of the applied voltage is set to a constant value at which the transmittance is minimized (the frequency corresponding to the input voltage Vd=−V2 or V2). That is, in the first period, the frequency of the applied voltage can be changed to a frequency in the first frequency range in which the transmittance rarely changes. However, in the second period, the frequency of the applied voltage can be changed to a frequency in the second frequency range in which the transmittance abruptly decreases. The second frequency range includes a frequency that minimizes the transmittance.

It should be understood by those skilled in the art that various modifications, combinations, sub-combinations and alterations may occur depending on design requirements and other factors insofar as they are within the scope of the appended claims or the equivalents thereof.

What is claimed is:

1. An optical unit comprising:
    an acousto-optic deflector including an acousto-optic medium; and
    drive control means for controlling the acousto-optic deflector by (i) changing a frequency of a voltage applied to the acousto-optic medium of the acousto-optic deflector to a first frequency in a first frequency range used for a deflection control of the acousto-optic deflector during a first period representing a deflection control period and (ii) changing the frequency of the applied voltage to a second frequency in a second frequency range different from the first frequency range during a second period representing a transmittance control period during which a transmittance of the acousto-optic deflector is controlled.

2. A method for controlling an acousto-optic deflector, comprising:
- controlling the acousto-optic deflector by (i) changing a frequency of a voltage applied to an acousto-optic medium of the acousto-optic deflector to a first frequency in a first frequency range used for a deflection control of the acousto-optic deflector during a first period representing a deflection control period and (ii) changing the frequency of the applied voltage to a second frequency in a second frequency range different from the first frequency range during a second period representing a transmittance control period during which a transmittance of the acousto-optic deflector is controlled.

3. A holographic apparatus for recording or reconstructing data on a holographic recording medium that records data using interference fringes generated by a reference light beam and a signal light beam, the apparatus comprising:
- an optical system for leading a light beam emitted from a light source to the holographic recording medium;
- an acousto-optic deflector including an acousto-optic medium, disposed in an optical path of the optical system, the light beam emitted from the light source being incident on the acousto-optic medium; and
- drive control means for controlling the acousto-optic deflector by (i) changing a frequency of a voltage applied to the acousto-optic medium of the acousto-optic deflector to a first frequency in a first frequency range used for a deflection control of the acousto-optic deflector during a first period representing a deflection control period and (ii) changing the frequency of the applied voltage to a second frequency in a second frequency range different from the first frequency range during a second period representing a transmittance control period during which a transmittance of the acousto-optic deflector is controlled.

4. The holographic apparatus according to claim 3, wherein the drive control means controls the acousto-optic deflector so that, in the first period, the frequency of the applied voltage is continuously changed in the first frequency range and, in the second period, the frequency of the applied voltage is maintained at a predetermined constant frequency.

5. The holographic apparatus according to claim 3, wherein the drive control means continuously changes the frequency of the applied voltage in the first period so that the light beam that has passed through the optical system is continuously emitted onto the same location on the holographic recording medium that is rotatingly driven for a predetermined period of time.

6. The holographic apparatus according to claim 3, wherein the drive control means controls the acousto-optic deflector so that, in the second period, the frequency of the applied voltage is changed to the second frequency that is a frequency at which the transmittance of the acousto-optic medium is minimized.

7. The holographic apparatus according to claim 3, wherein the first period and the second period alternately appear on a time axis.

8. An optical unit comprising:
- an acousto-optic deflector including an acousto-optic medium; and
- a drive control unit configured to control the acousto-optic deflector by (i) changing a frequency of a voltage applied to the acousto-optic medium of the acousto-optic deflector to a first frequency in a first frequency range used for a deflection control of the acousto-optic deflector during a first period representing a deflection control period and (ii) changing the frequency of the applied voltage to a second frequency in a second frequency range different from the first frequency range during a second period representing a transmittance control period during which a transmittance of the acousto-optic deflector is controlled.

9. A holographic apparatus for recording or reconstructing data on a holographic recording medium that records data using interference fringes generated by a reference light beam and a signal light beam, the apparatus comprising:
- an optical system configured to lead a light beam emitted from a light source to the holographic recording medium;
- an acousto-optic deflector including an acousto-optic medium disposed in an optical path of the optical system, the light beam emitted from the light source being incident on the acousto-optic medium; and
- a drive control unit configured to control the acousto-optic deflector by (i) changing a frequency of a voltage applied to the acousto-optic medium of the acousto-optic deflector to a first frequency in a first frequency range used for a deflection control of the acousto-optic deflector during a first period representing a deflection control period and (ii) changing the frequency of the applied voltage to a second frequency in a second frequency range different from the first frequency range during a second period representing a transmittance control period during which a transmittance of the acousto-optic deflector is controlled.

* * * * *